United States Patent [19]

Kaczmarek et al.

[11] Patent Number: 5,150,624
[45] Date of Patent: Sep. 29, 1992

[54] METHOD OF CALIBRATING A ROTARY TOOL UNIT FOR AN ASSEMBLY LINE

[76] Inventors: James S. Kaczmarek, 21317 Woodhill, Northville, Mich. 48167; James M. Steimel, 2436 Lassiter, Rochester Hills, Mich. 48309

[21] Appl. No.: 672,839

[22] Filed: Mar. 21, 1991

Related U.S. Application Data

[63] Continuation-in-part of Ser. No. 649,537, Feb. 1, 1991.

[51] Int. Cl.⁵ .................... B23Q 41/02; B62D 65/00; B65G 37/00
[52] U.S. Cl. .................... 73/865.9; 29/712; 29/792; 364/474.12
[58] Field of Search ............ 73/865.9, 1 R, 1 D, 73/1 J, 1 E, 2, 5; 33/502–505; 29/711, 712, 785, 792, 822, 823, 40, 64; 198/345.1, 345.2, 345.3, 502.1, 502.2, 502.3, 502.4; 364/474.02, 474.28, 474.34, 474.35, 474.12, 551.02, 571.01

[56] References Cited

U.S. PATENT DOCUMENTS

| | | | |
|---|---|---|---|
| 3,391,474 | 7/1968 | Hays, Jr. ..................... | 29/712 X |
| 4,077,106 | 3/1978 | Lichtenstein et al. ......... | 29/792 |
| 4,092,719 | 5/1978 | Salmon ........................ | 29/712 X |
| 4,291,797 | 9/1981 | Ewertowski .................. | 198/472 |
| 4,408,539 | 10/1983 | Wakabayashi ............... | 104/89 |
| 4,428,055 | 1/1984 | Kelley et al. ................. | 364/474.02 |
| 4,609,137 | 9/1986 | DeFilippis ................... | 228/47 |
| 4,637,108 | 1/1987 | Murata et al. ................ | 29/33 P |
| 4,674,181 | 6/1987 | Hamada et al. .............. | 29/712 X |
| 4,700,472 | 10/1987 | Muranaka .................... | 29/822 |
| 4,736,515 | 4/1988 | Catena ........................ | 29/714 |
| 4,809,430 | 3/1989 | Maruyama et al. .......... | 29/712 X |
| 4,813,529 | 3/1989 | Kawai et al. ................. | 198/468.6 |
| 4,928,383 | 5/1990 | Kaczmarek et al. .......... | 29/711 |
| 4,951,802 | 8/1990 | Weissgerber et al. ......... | 198/346.1 |
| 4,991,707 | 2/1991 | Alexander et al. ........... | 198/346.1 |
| 5,010,634 | 4/1991 | Uenura et al. ................ | 29/712 X |

FOREIGN PATENT DOCUMENTS

| | | |
|---|---|---|
| 1245863 | 7/1967 | Fed. Rep. of Germany . |
| 2813902 | 10/1979 | Fed. Rep. of Germany . |
| 2928912 | 1/1981 | Fed. Rep. of Germany .......... 29/40 |
| 3432803 | 4/1985 | Fed. Rep. of Germany . |
| 1232470 | 5/1986 | U.S.S.R. ................. 29/792 |
| 2075437 | 11/1981 | United Kingdom . |
| 2148225 | 5/1985 | United Kingdom . |

*Primary Examiner*—Tom Noland

[57] ABSTRACT

A production line manufacturing system and method for building automotive vehicle bodies wherein a succession of workpieces is moved past stationary work stations includes programmable multi-position rotate unit that can be used in each of the work stations to accommodate both changes in workpieces to be processed and tools. The rotate unit comprises a four-position horizontally arranged fixture rotate table including four vertically arranged fixtures removably mounted thereon. A precision locator key on each of the fixtures positions each individual fixture on the rotate table and also serves as a positive fixture stop in the work position. A control for detecting the presence of a vehicle frame to be worked on controls the operation of the carrier and motor drive and cooperates to accurately position a desired fixture adjacent to the work position. The fixture stop makes contact with a programmable clamping means associated with the base and fixtures whereby the rotate table and a selected fixture are locked into a desired position.

1 Claim, 16 Drawing Sheets

METHOD OF CALIBRATING A ROTARY TOOL UNIT FOR AN ASSEMBLY LINE

This is a continuation in part of the U.S. patent application Ser. No. 07/649,537, filed Feb. 1, 1991.

BACKGROUND AND SUMMARY OF THE INVENTION

The present invention relates to a product assembly system and method of assembly. More particularly, this invention concerns a production line manufacturing system and method for building automotive vehicle bodies wherein a succession of workpieces is moved past stationary work stations. This invention is also concerned with a programmable multi-position rotate unit that can be used in each of the work stations to accommodate both changes in workpieces to be processed and tools.

Assembly systems for welding together automotive vehicle bodies by programmable robots and which provide respot or finish welding at successive welding stations are known. These assembly systems typically include a carrier which transfer a succession of workpiece holding pallets along a route passing through one or more framing welding stations. Each framing welding station typically includes a programmable robot to perform the welding operations and to preassemble a "body in white" from workpieces. Exemplary of an asynchronous assembly system is U.S. Pat. No. 4,928,383 of the inventors herein, the disclosure of which being specifically incorporated herein by reference.

One disadvantage with some of the previous assembly systems is that the work stations did not allow the user to verify, measure, and update data for fixturing, tooling, workpiece conditions and machining results and then react to this data in a fully automatic mode. Further, changing the model mix was not always totally flexible and resulted in some downtime. Desirably, the work station would include a platform which is rapidly replaceable to accommodate model mix.

Previous systems utilized palletized work stations, wherein each subassembly is built upon a different tooling pallet (e.g., a carousel turntable, automatically guided vehicle, palletized conveyors) which while flexible, did not assure repeatability. It would be desirable to have flexibility of processing different parts in a single line with each station being programmable.

An object of the present invention is to provide an assembly system such as for welding vehicle bodies and a flexible work cell therefor. A work cell in accordance with this invention has flexibility, whereby to change part loading frames easily and which can stop almost instantaneously.

An object of this invention therefor is a manufacturing process which can accommodate model mix and be quickly retrofitted to run prototype parts without interrupting current production, transport a plurality of parts to be worked on in an asynchronous manner along a single endless line between a series of work stations, and perform a sequential variety of operations on the parts, each work station being programmable, to select an operation to be performed, including performing no operation at all, whereby to expose the parts to a fraction of the operating capacity of the line.

Briefly stated, to accomplish the foregoing objects, the present invention is directed to a vehicle body welding assembly system including at least one working cell and a carrier adjacent thereto for transporting vehicles bodies, such as vehicle side frames, to and from the working cell. The assembly system is expandable to include a plurality of like configured working cells, as needed, and serviced by the carrier.

The working cell comprises a permanently installed base and a four-position horizontally arranged fixture rotate table including four vertically arranged fixtures removably mounted thereon. A precision locator key on each of the fixtures positions each individual fixture on the rotate table and also serves as a positive fixture stop in the work position. A single gear wheel arranged horizontally is connected to the rotary table and has radially inwardly directed gear teeth which mesh with corresponding radial teeth on a motor drive to rotate the table in either direction, the gear and motor drive being centrally accessible and vertically replaceable and functioning with programmable control means to provide rapid braking. A pallet means is connected to the carrier and suspended vertically above the rotate table and brought into registration with a predetermined fixture. Depending on the model mix, the table may not have to rotate at all. A control for detecting the presence of a vehicle frame to be worked on controls the operation of the carrier and motor drive and cooperates to accurately position a desired fixture adjacent to the work position. The fixture stop makes contact with a programmable clamping means associated with the base and fixtures whereby the rotate table and a selected fixture are locked into a desired position.

Advantageously each fixture itself determines the final position, not the rotate unit. This results in a higher level of accuracy and repeatability than present systems. As a result, precise positioning or dimensional accuracy of the pallet is not required.

The work cell is multi-sided to include a four station arrangement but can advantageously be expanded into a five or six station.

Another advantage of the system herein is that a control system can be programmed for a given model mix and then be reprogrammed for a different model mix without programming each station independently.

Downtime is minimized because without interrupting current production, maintenance can be performed on stored idle tools and idle tools can be exchanged for model change.

Further objects and advantages will become apparent from the following specification taken in conjunction with the accompanying drawings.

BRIEF DESCRIPTION OF THE DRAWINGS

FIG. 16 is a diagrammatic illustration of the rotation of the unit and shows the use of a multiple revolver rotation transducer.

DETAILED DESCRIPTION OF THE PREFERRED EMBODIMENT

Figure 1:
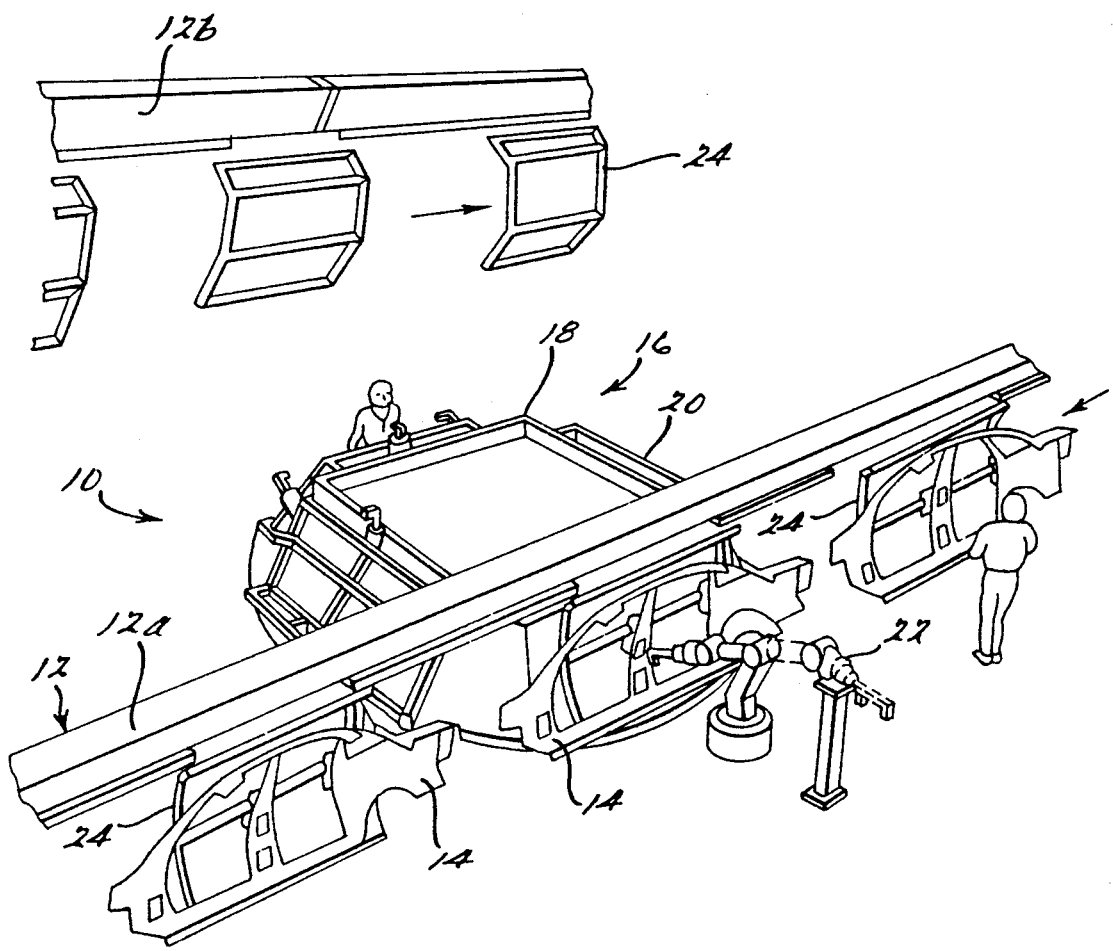
FIG. 1 is a partial perspective view, in plan, of an assembly system having one work cell and a conveyor for transporting parts to be worked on to the work cell.
Figure 2:
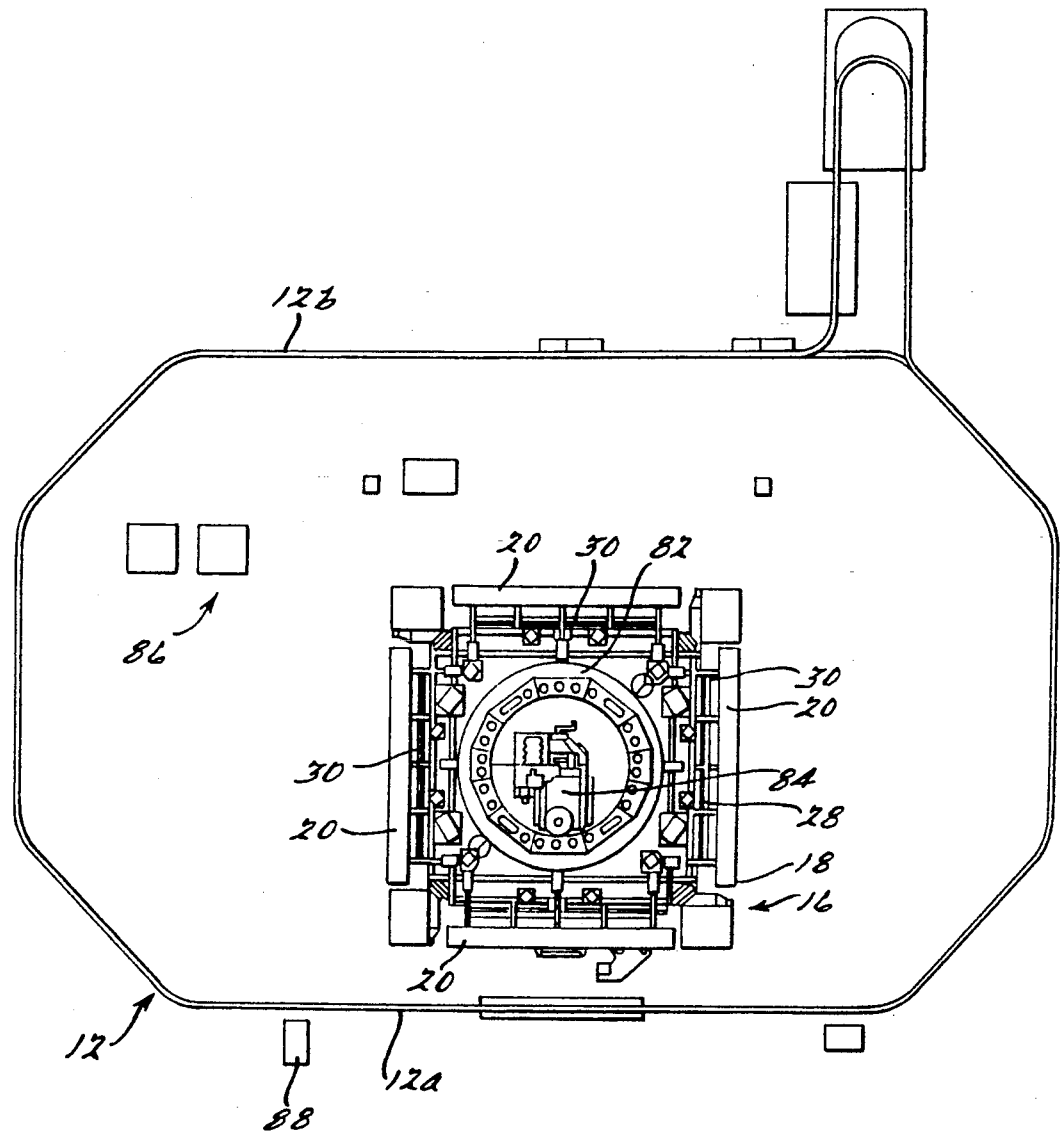
FIG. 2 is a plan view of the assembly system shown in FIG. 1.

Referring now to the drawings, FIGS. 1-15 illustrate an assembly system or production line, generally indicated at 10, in accordance with the present invention. The assembly system 10 includes an overhead power and free conveyor, generally indicated at 12, for transporting vehicle bodies 14 into and from a work station 16 comprising a multi-position rotate unit 18 for positioning any of four workpiece mounting fixtures 20 relative to the conveyor and to robots 22, each robot being provided with preselected tooling or a welding gun and programmed for performing a predetermined operation.

Figure 15A:
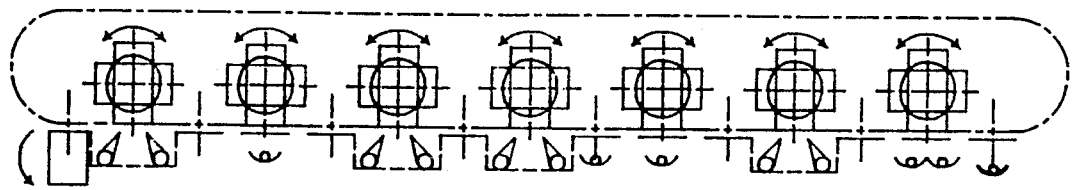
FIGS. 15A-15L show an assembly operation of an assembly system having a conveyor and seven working cells.
Figure 15B:
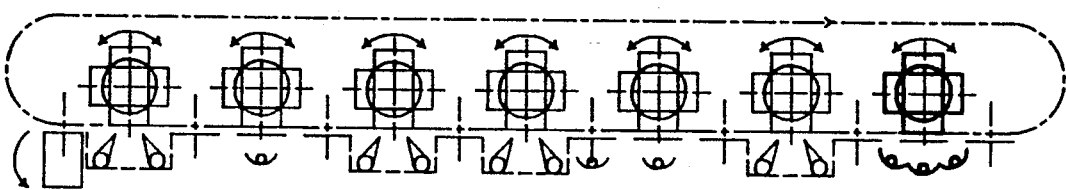
Figure 15C:
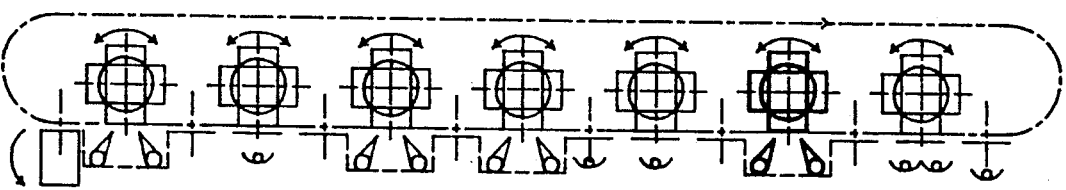
Figure 15D:
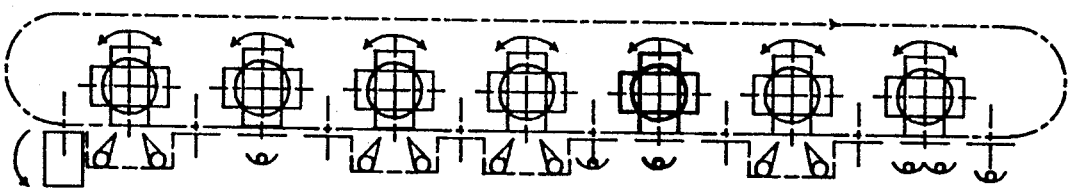
Figure 15E:
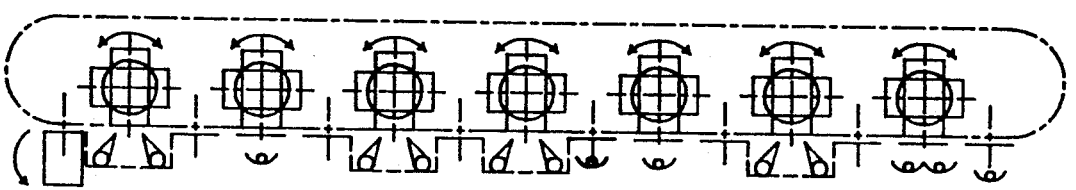
Figure 15F:
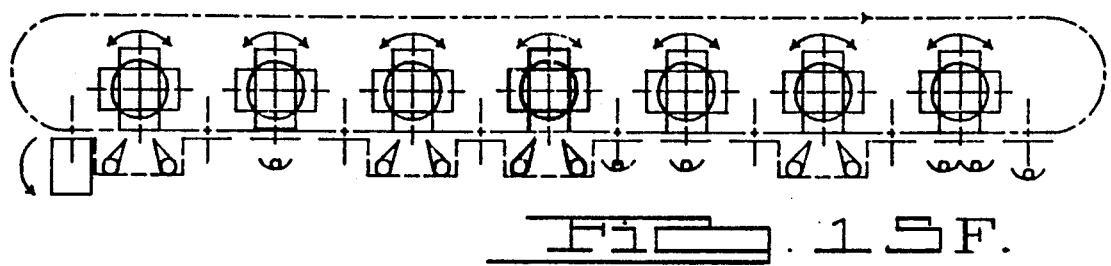
Figure 15G:
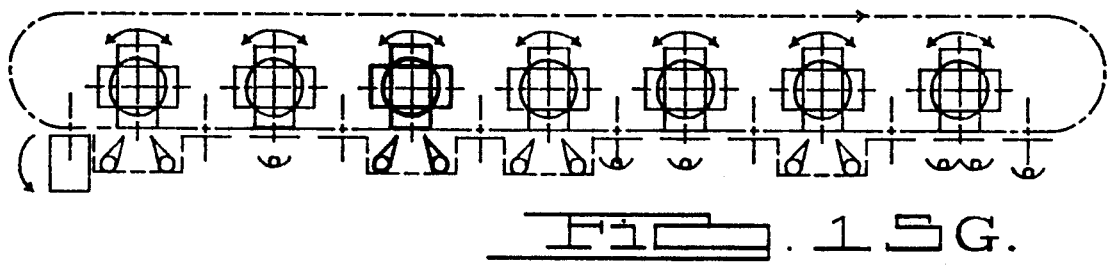
Figure 15H:
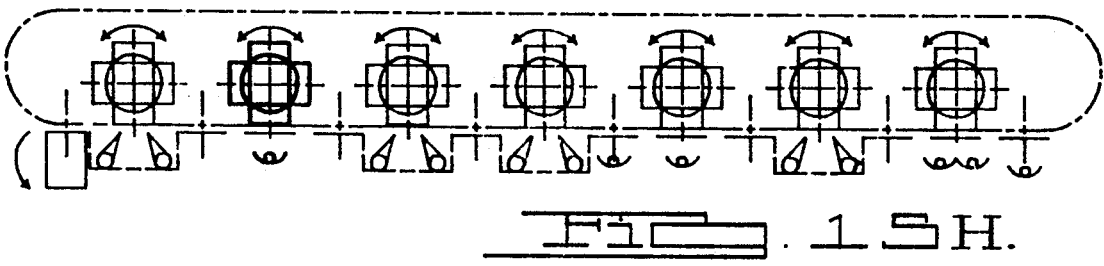
Figure 15I:
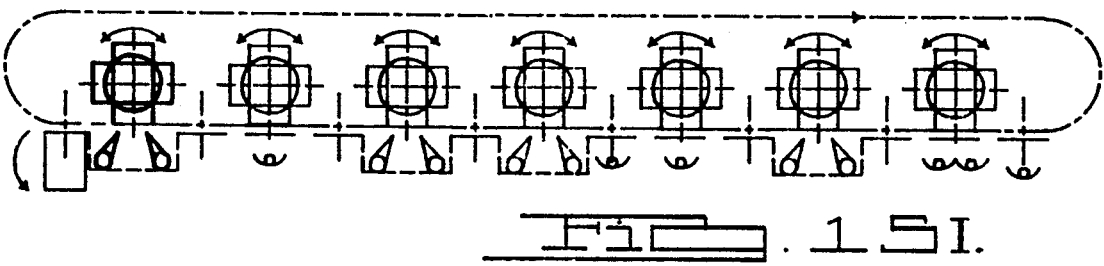
Figure 15J:
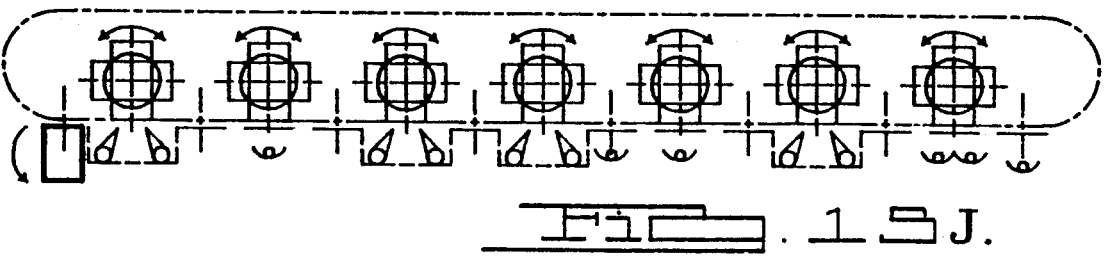

While only one work station 16 is shown in FIG. 1, the assembly system shown in FIGS. 15A to 15N comprises seven work stations, each station having a substantially identical rotate unit 18 but different robots and work tools. The number of work stations would change, depending on the particular assembly application and number of assembly steps required. While the discussion will be illustrative of a welding system for an automotive vehicle, it will be appreciated that the method of assembly and tooling exchange technique can be readily adapted for other applications.

As shown in FIG. 1, a plurality of carriers or pallets 24 are connected to conveyor 12 in seriatim to form a production line for conveying workpieces 14 into and from work station 16. Pallets 24 function to support workpiece 14, mount the workpiece onto mounting fixtures 20, and transfer or transport the workpieces along a predetermined path. The workpiece shown for the purpose of illustration is a side panel of a vehicle body and the pallet 24 supports the side panel in a vertical plane at a position adjacent the successive work stations.

Conveyor 12 has a first portion 12a at the ground level for assembly and a second portion 12b elevated on the return loop to provide clearance to various machine tools stored for use at the station for installation, removal, maintenance or tryout without disturbing current production. Carriers 24 are adapted to be disengaged from the overhead conveyor at each station for mounting on a preselected mounting fixture 20 and can be re-engaged with the conveyor when needed. This permits synchronous or asynchronous operation or the station can be cleared for dimensional certification and change for new model fixturing.

Adjacent work station 16 an operator would load loose parts on an advancing workpiece (i.e., side panel) which is initially clear of the work cell. During the work cycle pallets 24 are located and positioned back away from the workpiece. In the work station programmed robot 22 would be directed to perform a function, such as weld or assemble the loose parts to the side panel. Additionally, another worker could perform maintenance operations on another mounting fixture or perform manual welding operations, as needed. The pallet is disengaged from overhead conveyor 12 and clears product in work cell. The transfer can clear the station with safe and easy access for inspection and maintenance.

In the embodiment shown, the work station includes a permanently installed four position fixture exchange rotate unit 18 with capacity to store and deliver four or more unique side frame tools. The work station includes a substantially horizontal stationary base 26, a substantially horizontal rotary table 28 mounted to the base for rotation thereabout and about a substantially vertical axis, and a plurality of mounting fixtures 20 for mounting the pallets 24.

Rotary table 28 comprises a multi-sided box-like structure with each side 30 of the table being arranged vertically and each being adapted to be positioned in centered relation adjacent to the conveyor and a pallet 24 supporting a side panel. Table 28 is formed by elongated rectangular cross-sectioned beams being secured together to define a rectangular box-like structure that sits on rollers 32 on base 26, the box structure being open at the top and defining four substantially identical sides of generally rectangular shape. While shown best in FIG. 4 each side 30 is configured to mount one of the pallet mounting fixtures 20 and each side comprises horizontally extending upper and lower beams 34 and 36, and vertically extending side beams 38 and 40.

Mounting fixture 20 is generally rectangular, adapted to be removably mounted on a selected side 30 of rotary table 28, and includes horizontally extending upper and lower beams 42 and 44 and vertically extending side beams 46 and 48. The fixture, table sides, and vehicle frames are generally vertically disposed to allow easy manual or robot load, weld and maintenance. Appropriate pallet mounting and locating fixturing (now shown) is disposed on each mounting fixture for securing the pallet and its associated vehicle frame thereto.

A fixture mounting arrangement includes receivers 48 extending from upper beams 34 of the side frames 30 for receiving respective mounting blocks 50 extending from upper beams 40 of the mounting fixtures 20. Advantageously, the tables can be easily lowered vertically into place and removed.

Each individual mounting fixture 20 is dimensionally positioned on the rotate unit via a precision locator assembly 52 which includes a locator key 54 which is received in a locator keyway 56 disposed on base 26 and a locator block 58 which serves as a positive fixture stop to define the work position. The fixtures 20 determine the final position of workpieces 14, not the rotate unit 18.

A table clamping and locating arrangement 60 includes the locator blocks 58, operatively attached with each respective mounting fixture 20, to define predetermined stopping locations of rotary table 28, and a pair of programmable external clamping blocks 62 and 64 connected to base 26 and programmed for radial sliding movement inwardly and outwardly and in a direction transverse to the direction of rotation of the table. Locator block 58 has a pair of radial faces 66A and 66B and a pair of cam faces 68A and 68B, the faces 66A and 68A, and 66B and 68B facing in opposite directions of rotation.

Clamping blocks 62 and 64 include, respectively, a radial face 70A and 70B, each which face in opposite directions of rotation. Associated with each clamping block is an electro-hydraulically actuated shock absorber or piston 72A and 72B and a pivotable cam 74A and 74B. Each piston includes a retractable plunger 76A and 76B adapted to engage a radial face 66A or 66B depending on whether the rotate table is moving clockwise or counterclockwise. Cams 74A and 74B are connected by pins 75A and 75B to the respective clamping blocks 62 and 64. Cam 74A operates in conjunction with piston 72B and plunger 76B on the clamping block 64, and cam 74B operates in conjunction with piston 72A and plunger 76A on clamping block 62, to brake the rotation of the table in the respective direction of rotation and then securely lock the locator block 58 in place. The two clamping blocks are sequentially actuated, depending on whether the rotate table is moving clockwise or counterclockwise, and operate as a brake both to reduce the rotation of the table and to sandwich the locator block therebetween to prevent unwanted rotation of the rotary table. Once the fixture stop makes contact with a programmable external stop and piston it is located into position to prevent rotation.

Figure 7A:
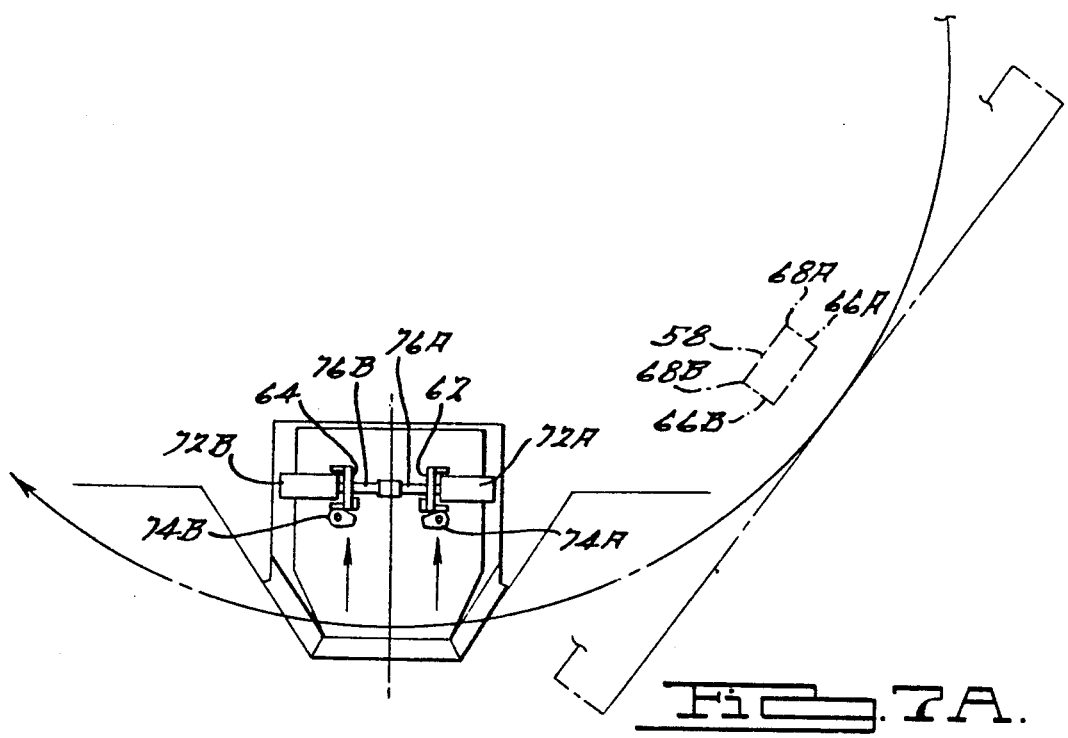
FIGS. 7A, 7B and 7C show operation of the clamp and locating means for clockwise rotation.
Figure 7B:
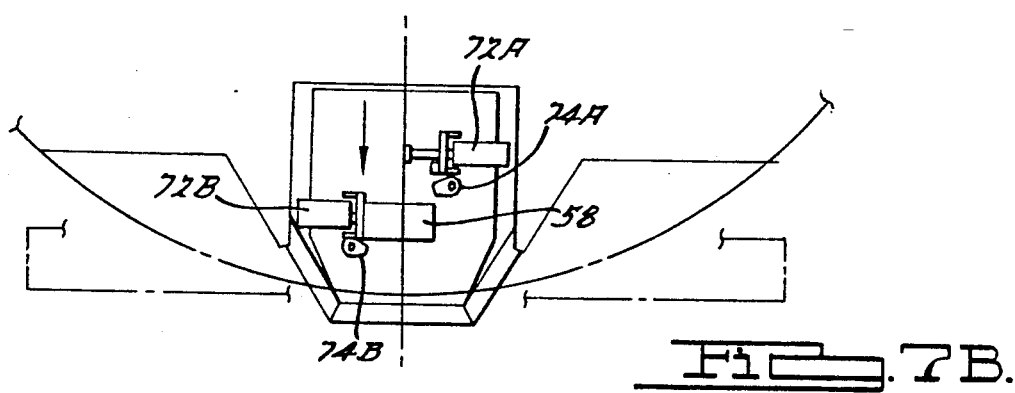
Figure 7C:
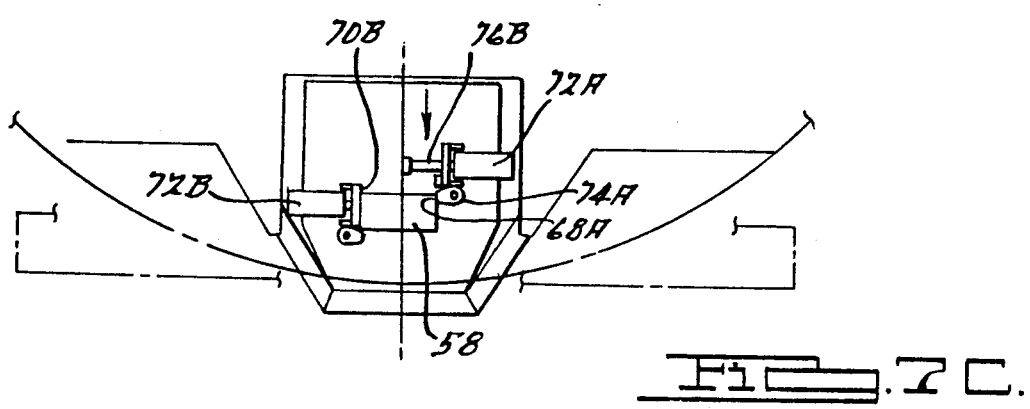

FIGS. 7A-7C show table 28 rotating clockwise. In FIG. 7A, clamping blocks 62 and 64 are retracted radially inward. In FIG. 7B, clamping block 62 is held inward and clamping block 64 moved radially outward and into the path of locator block 58. As the table continues to rotate, face 66B of clamping block 64 engages plunger 76B to reduce the rotation of the table. After locator block 58 has nearly decelerated to a stop, clamping block 62 is actuated and driven radially outward whereby its cam 74A is driven against cam face 68A of the locator block. When the work at this station is completed and a new fixture is desired, the control will retract both clamping blocks and the table will rotate in the direction desired.

Figure 8A:
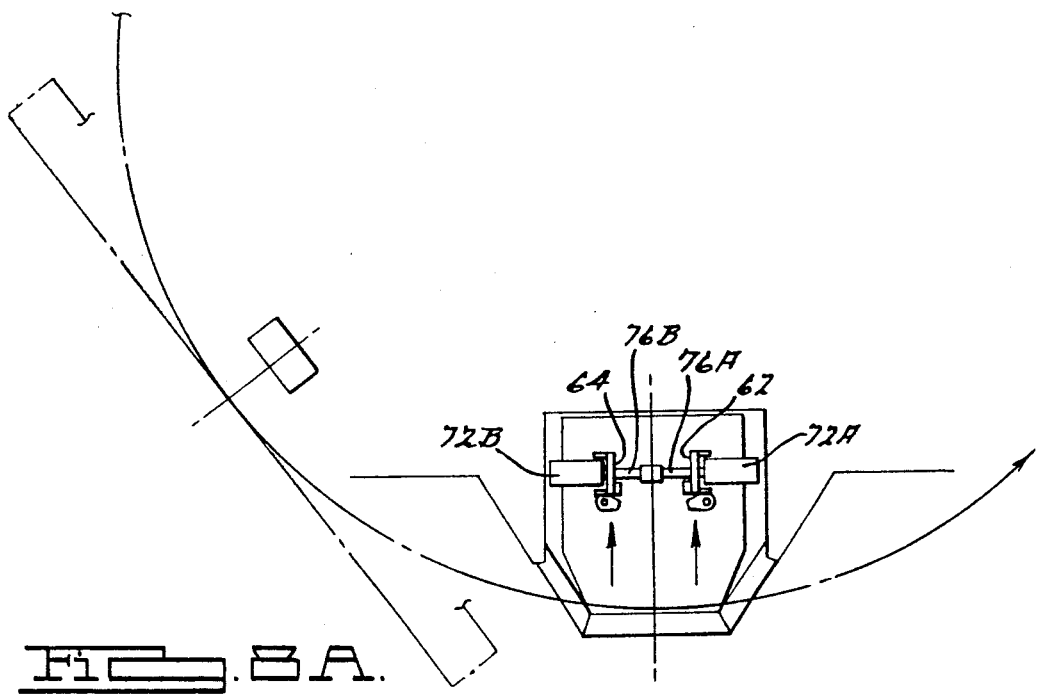
FIGS. 8A, 8B and 8C show operation of the clamp and locating means for counterclockwise rotation.
Figure 8B:
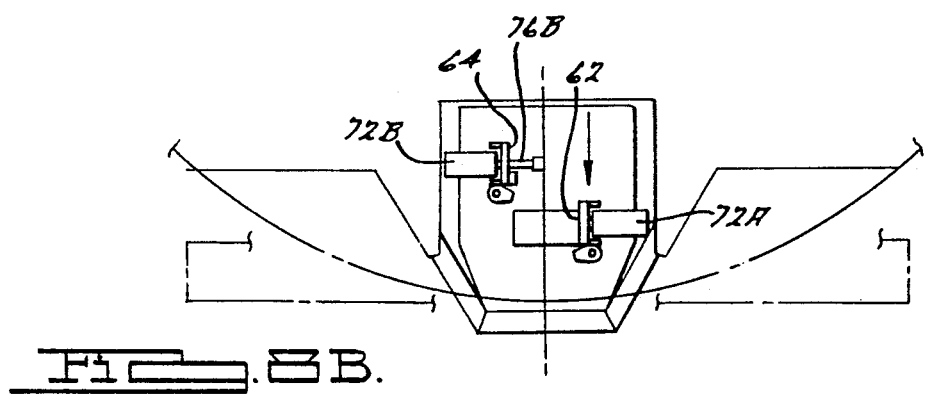
Figure 8C:
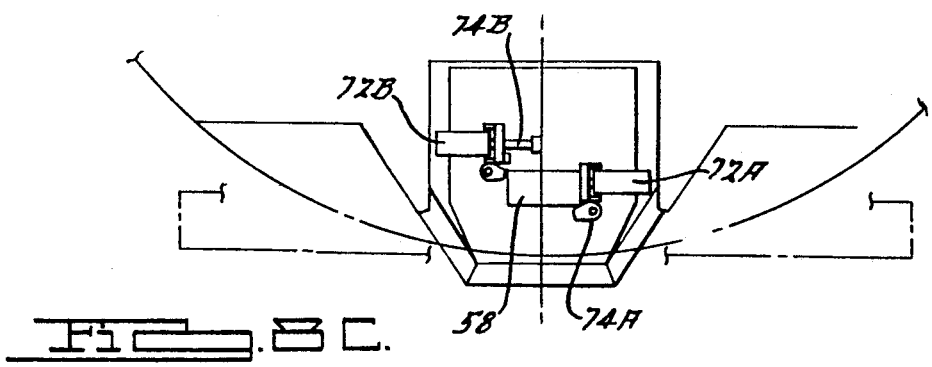
Figure 9A:
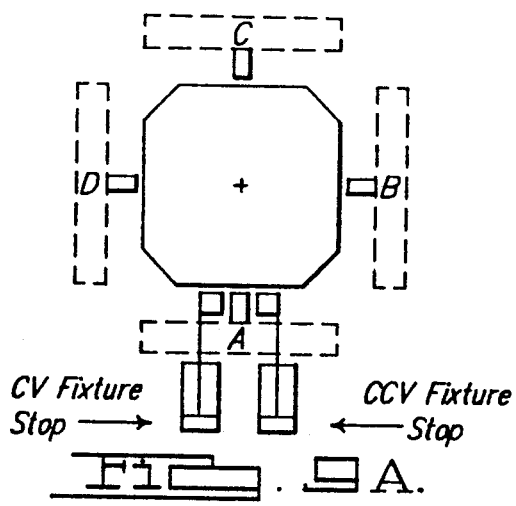
FIGS. 9A-14E, hereafter referred to collectively as FIGS. 9-14 show calibration of the control for operation of the rotate unit.
Figure 9B:
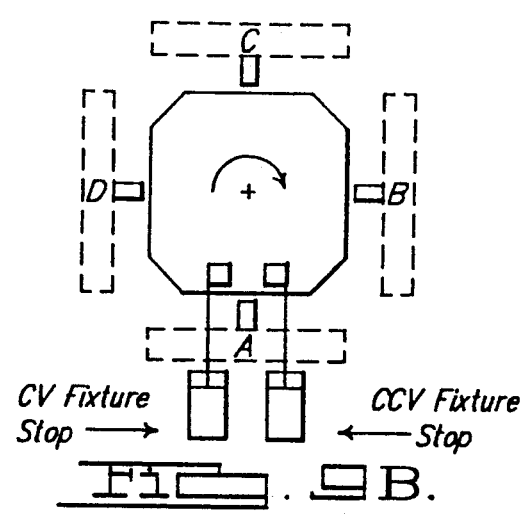
Figure 9C:
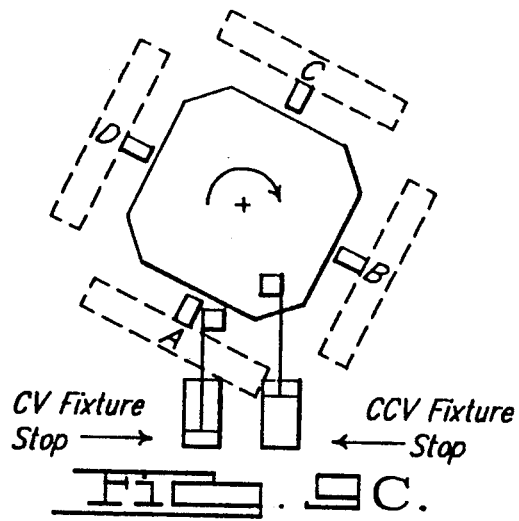
Figure 9D:
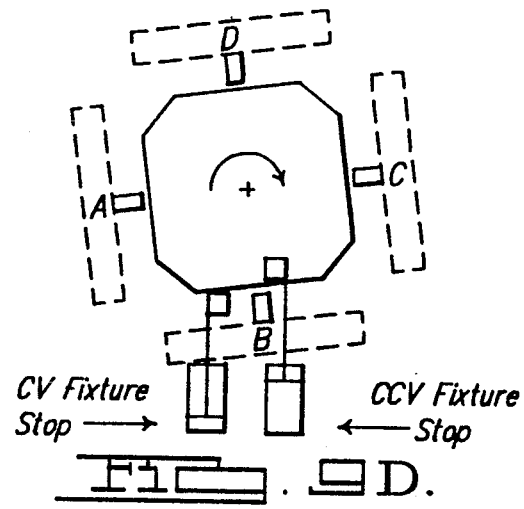
Figure 9E:
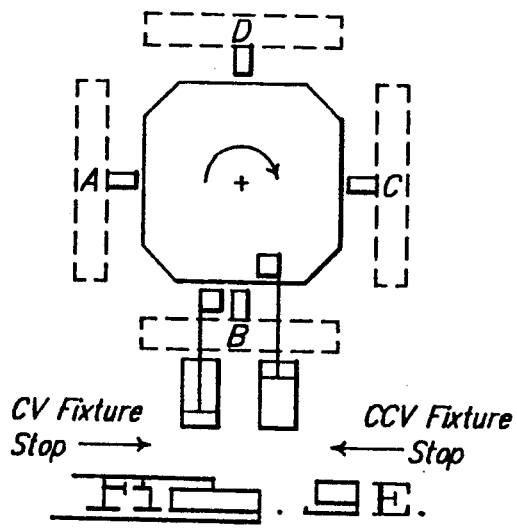
Figure 9F:
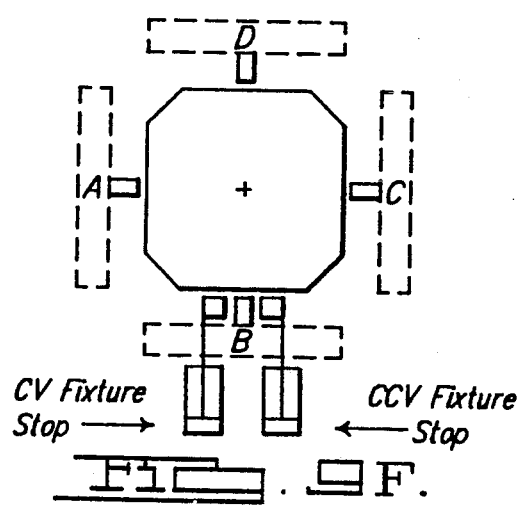
Figure 10A:
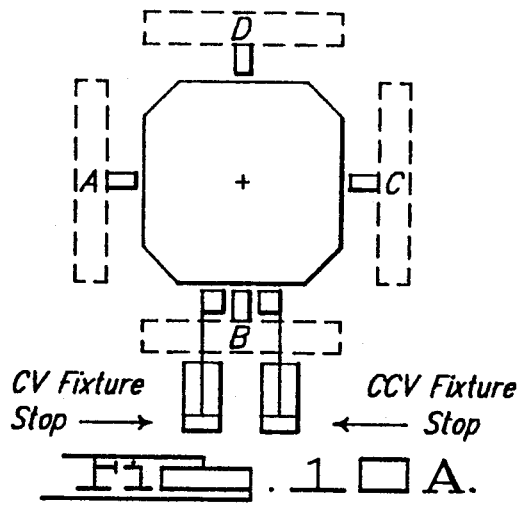
Figure 10B:
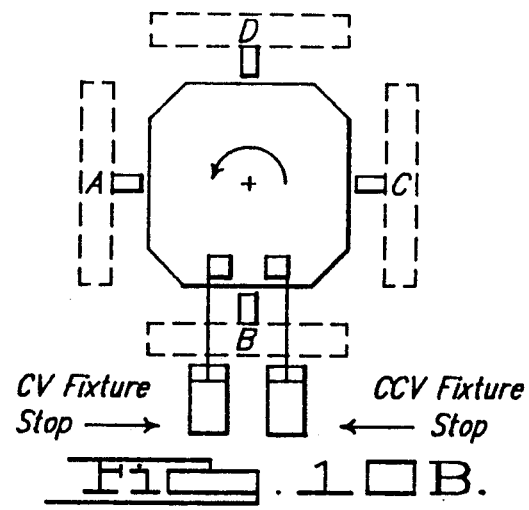
Figure 10C:
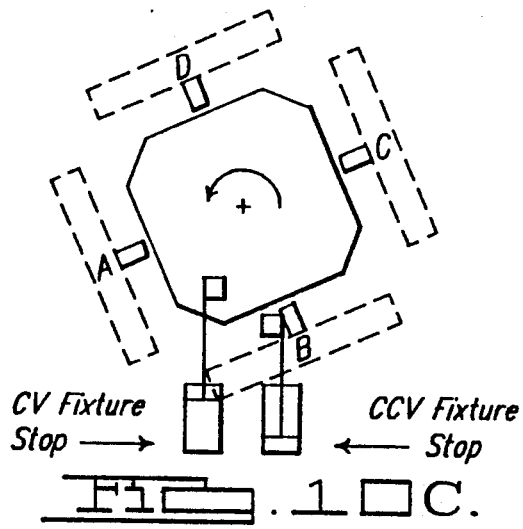
Figure 10D:
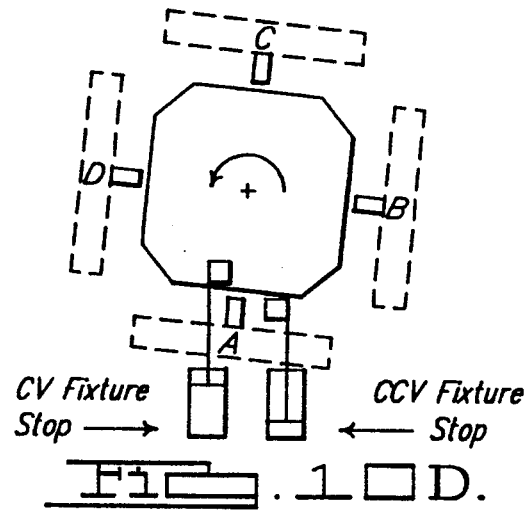
Figure 10E:
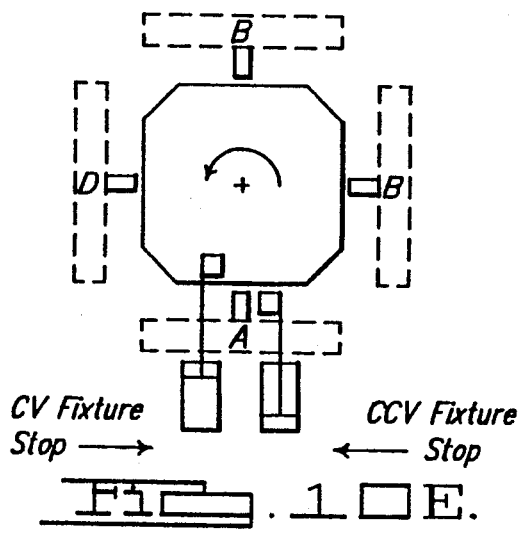
Figure 10F:
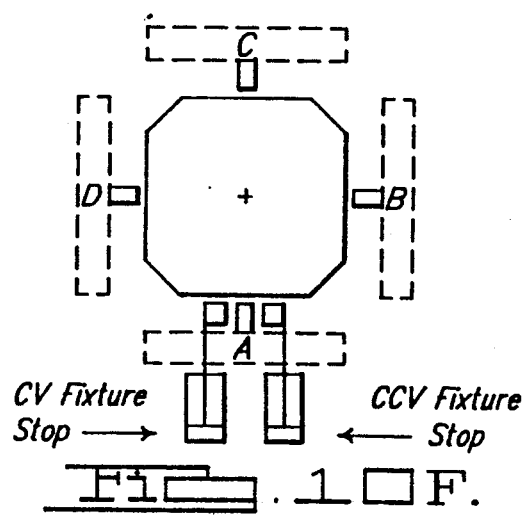
Figure 11A:
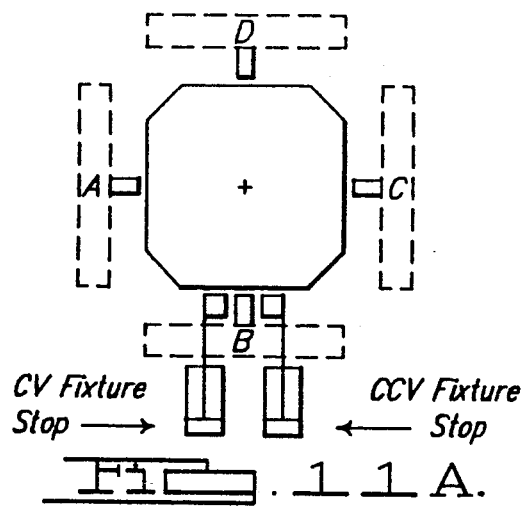
Figure 11B:
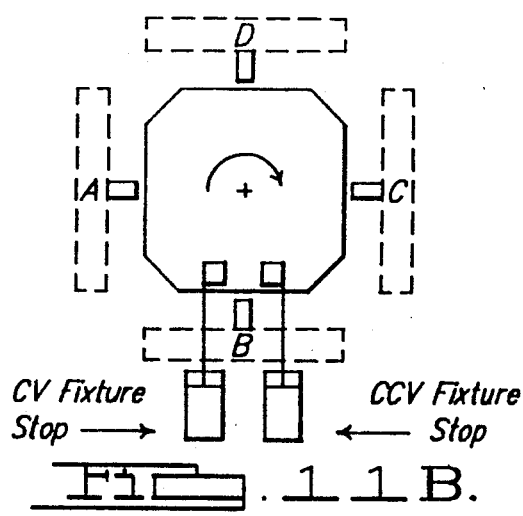
Figure 11C:
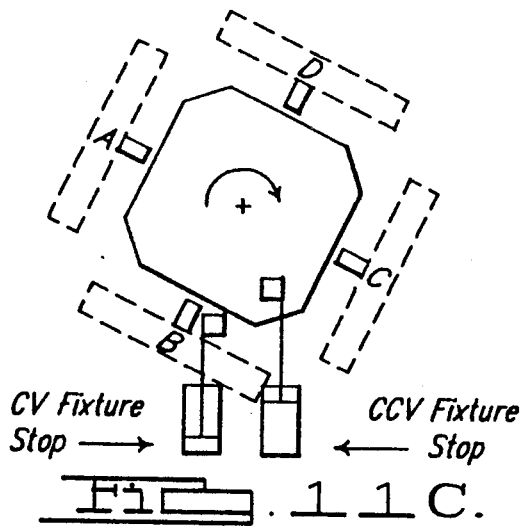
Figure 11D:
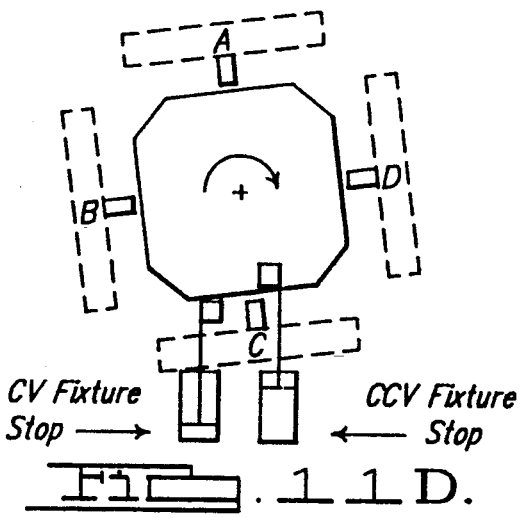
Figure 11E:
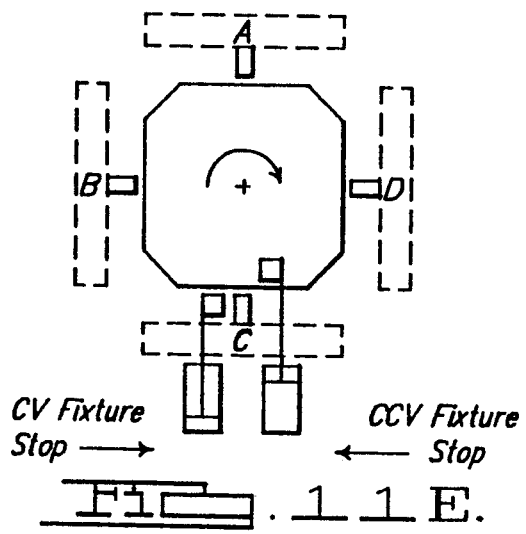
Figure 11F:
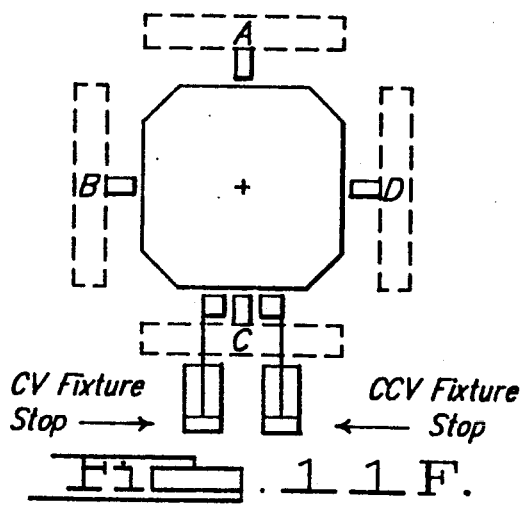
Figure 12A:
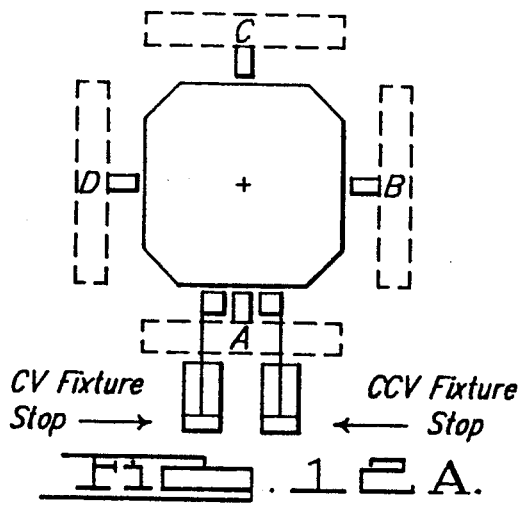
Figure 12B:
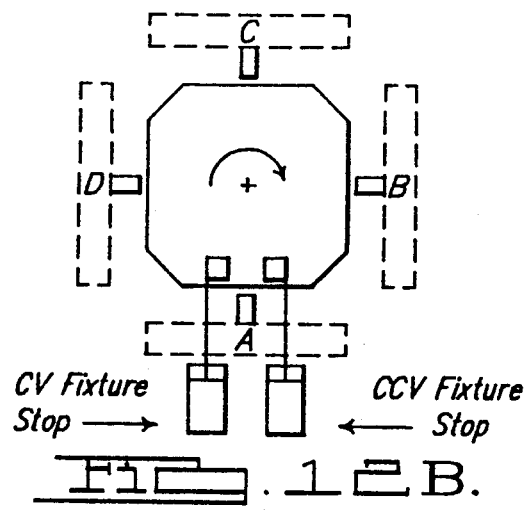
Figure 12C:
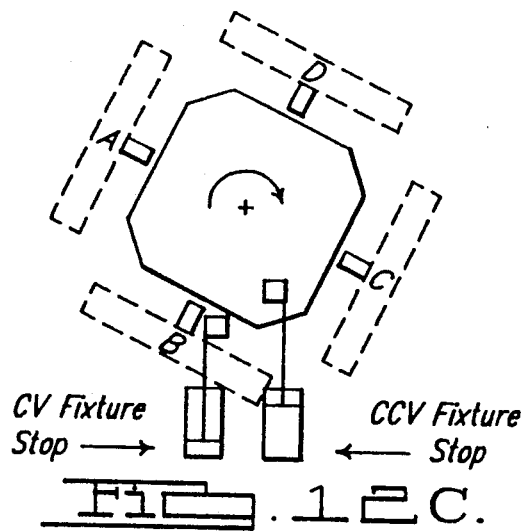
Figure 12D:
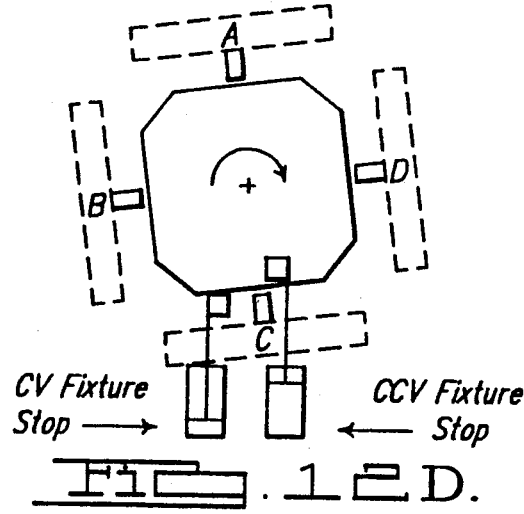
Figure 12E:
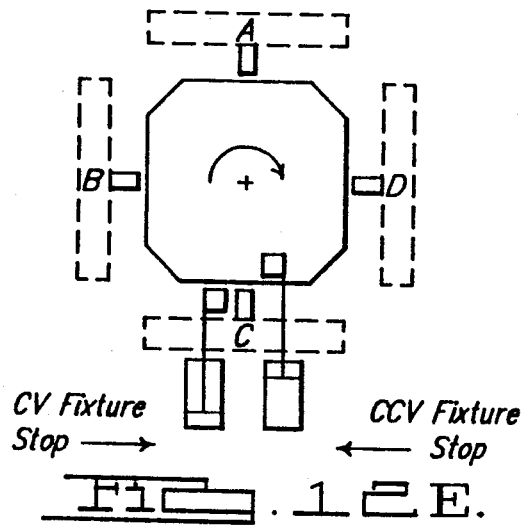
Figure 12F:
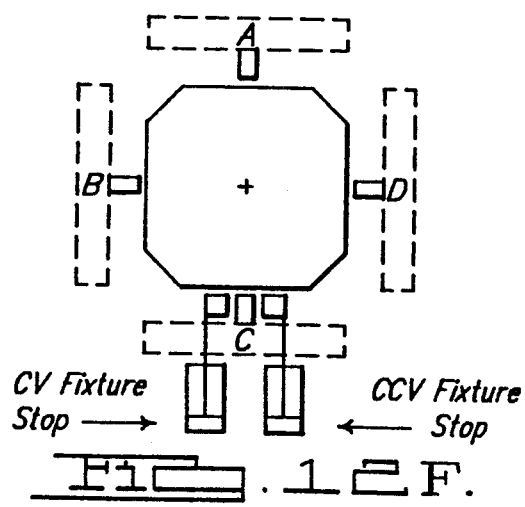
Figure 13A:
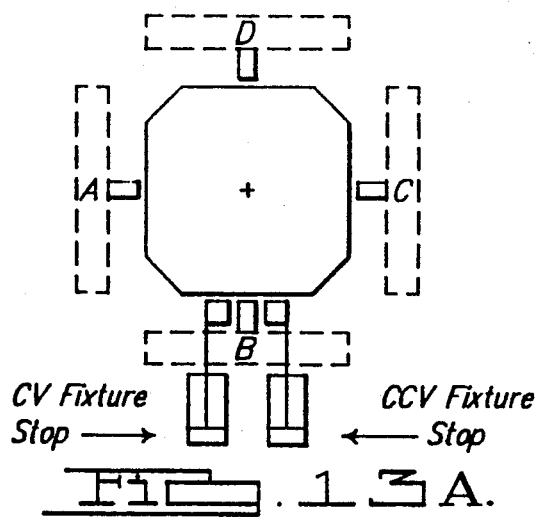
Figure 13B:
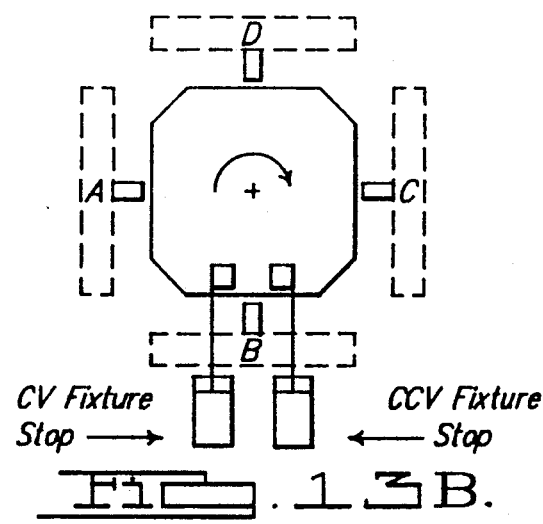
Figure 13C:
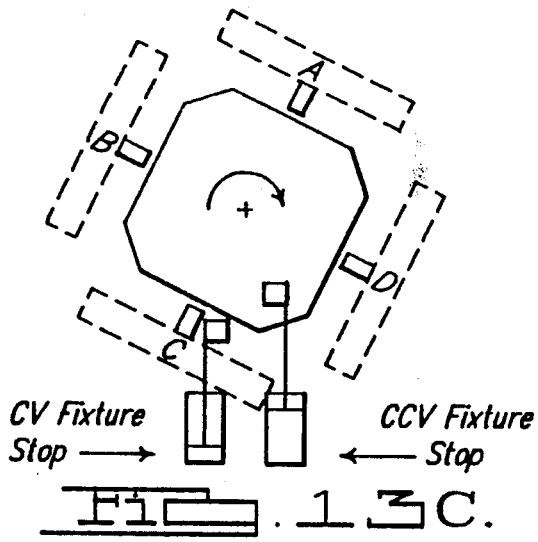
Figure 13D:
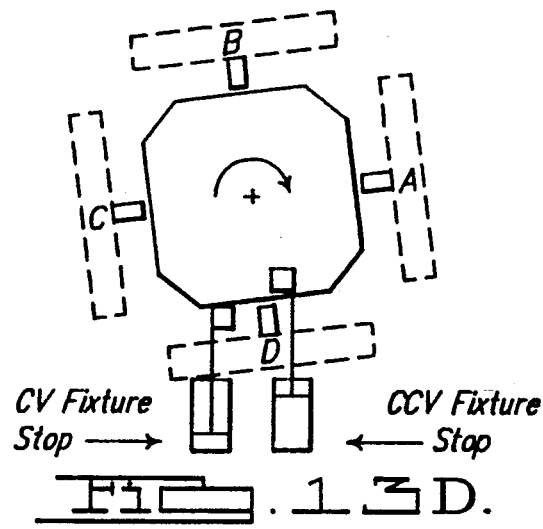
Figure 13E:
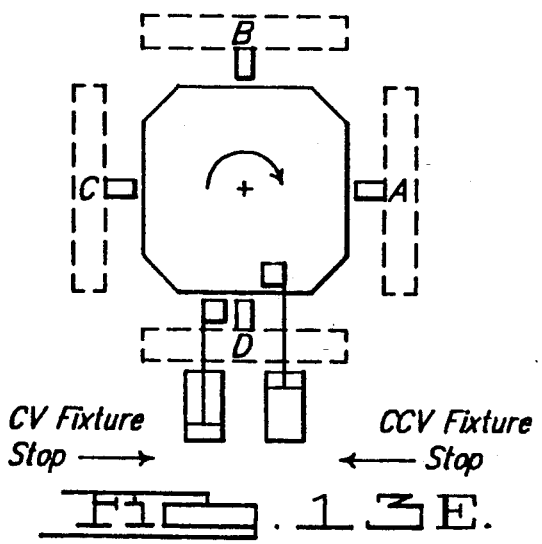
Figure 13F:
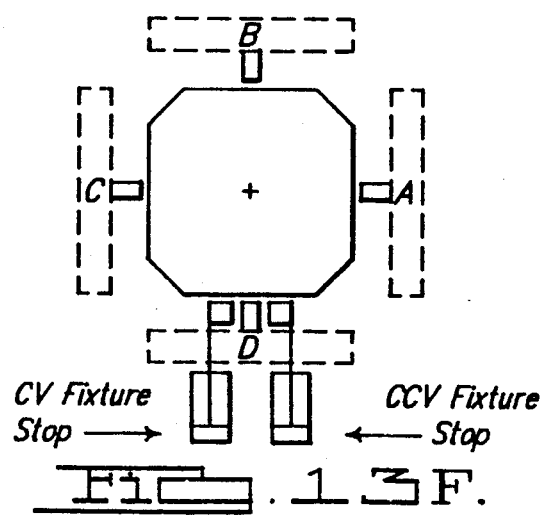
Figure 14A:
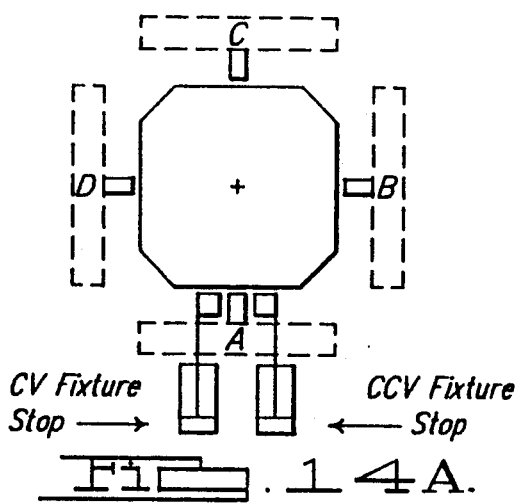
Figure 14B:
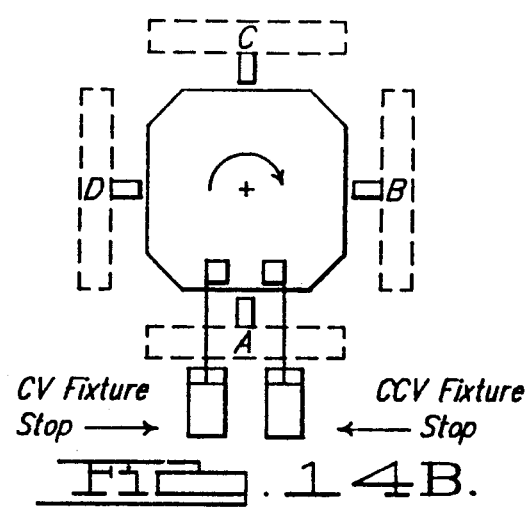
Figure 14C:
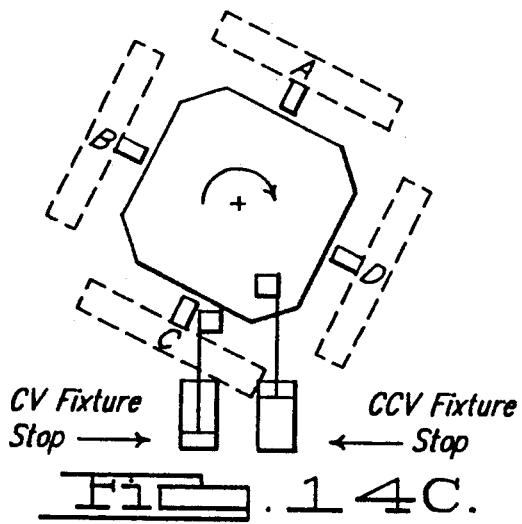
Figure 14D:
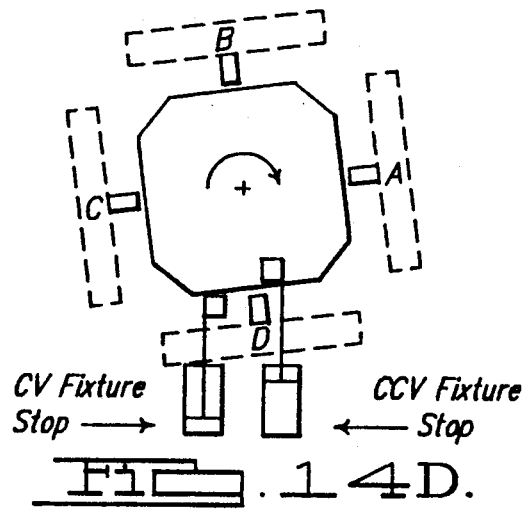
Figure 14E:
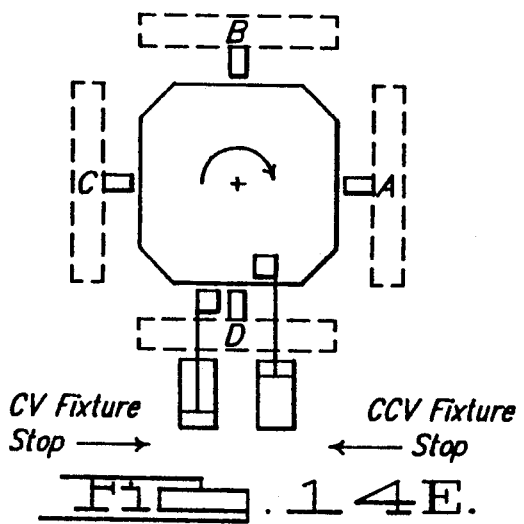
Figure 14F:
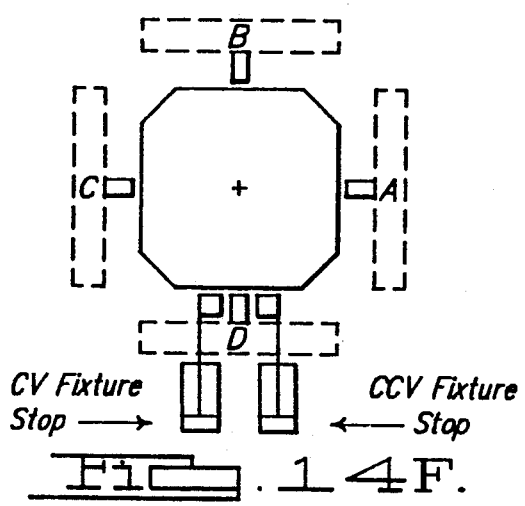

FIGS. 8A-8C show table 28 rotating in the counterclockwise direction, the process being opposite to that described. Briefly, clamping block 62 is driven outward whereby approaching face 66A of locator engages plunger 76A to decelerate to a stop against face 70A of block 62 and cam 74B is driven against cam face 68B of locator block 58.

Should the power fail, the blocks are biased into locked engagement with the locator block and the table is locked against rotation. The total rotate is limited to 270°.

The center of the rotate unit positions for access a variable speed AC drive both for the rotate unit and the conveyor. While a robot is working on one mounting frame the operator can work on another frame whereby to accommodate other model changes and revisions and try out tools without interrupting current production.

Figure 3:
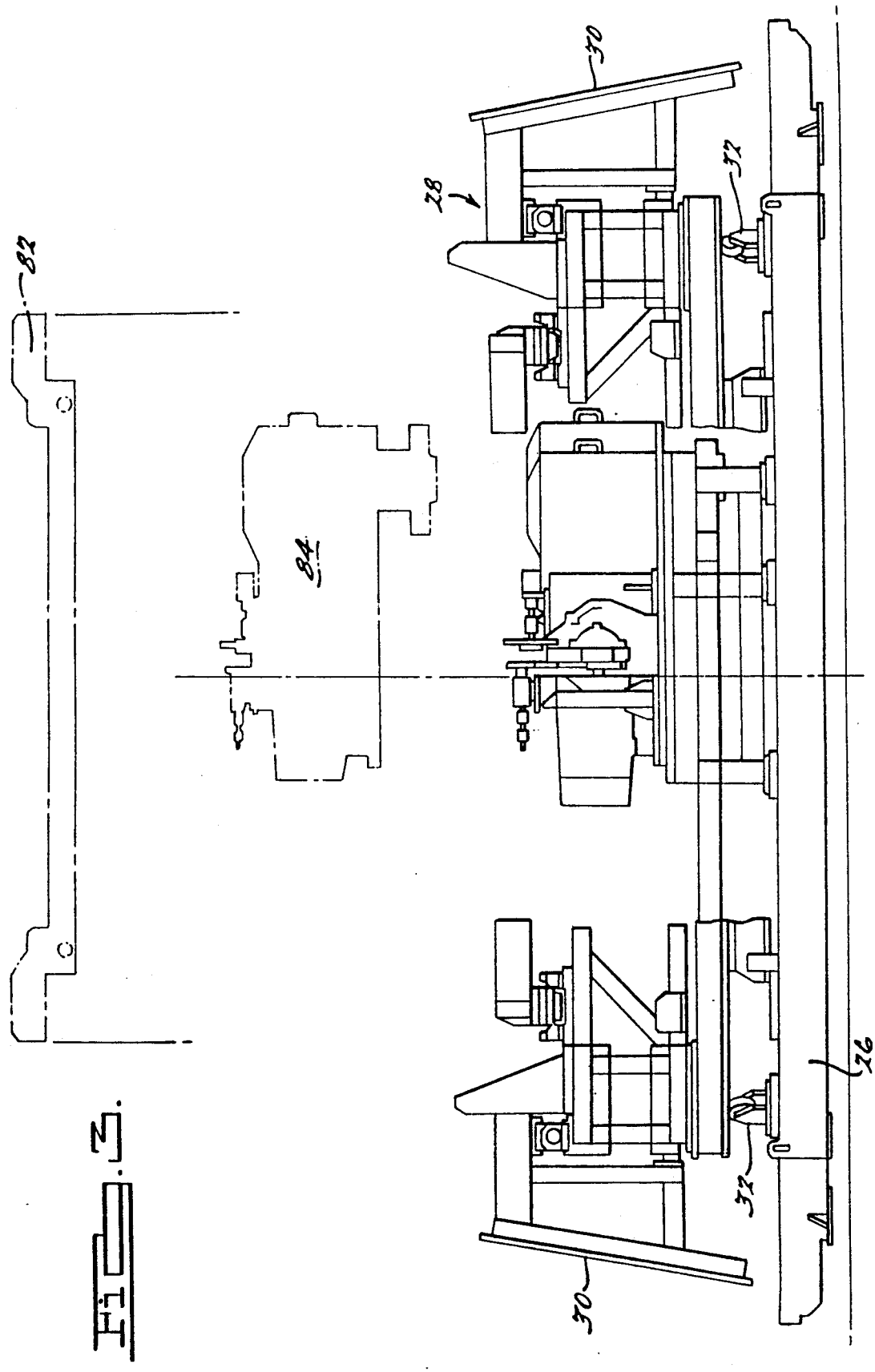
FIG. 3 is an elevation view of the work cell, partially broken away, and showing removal of a drive bearing and a drive unit.
Figure 4:
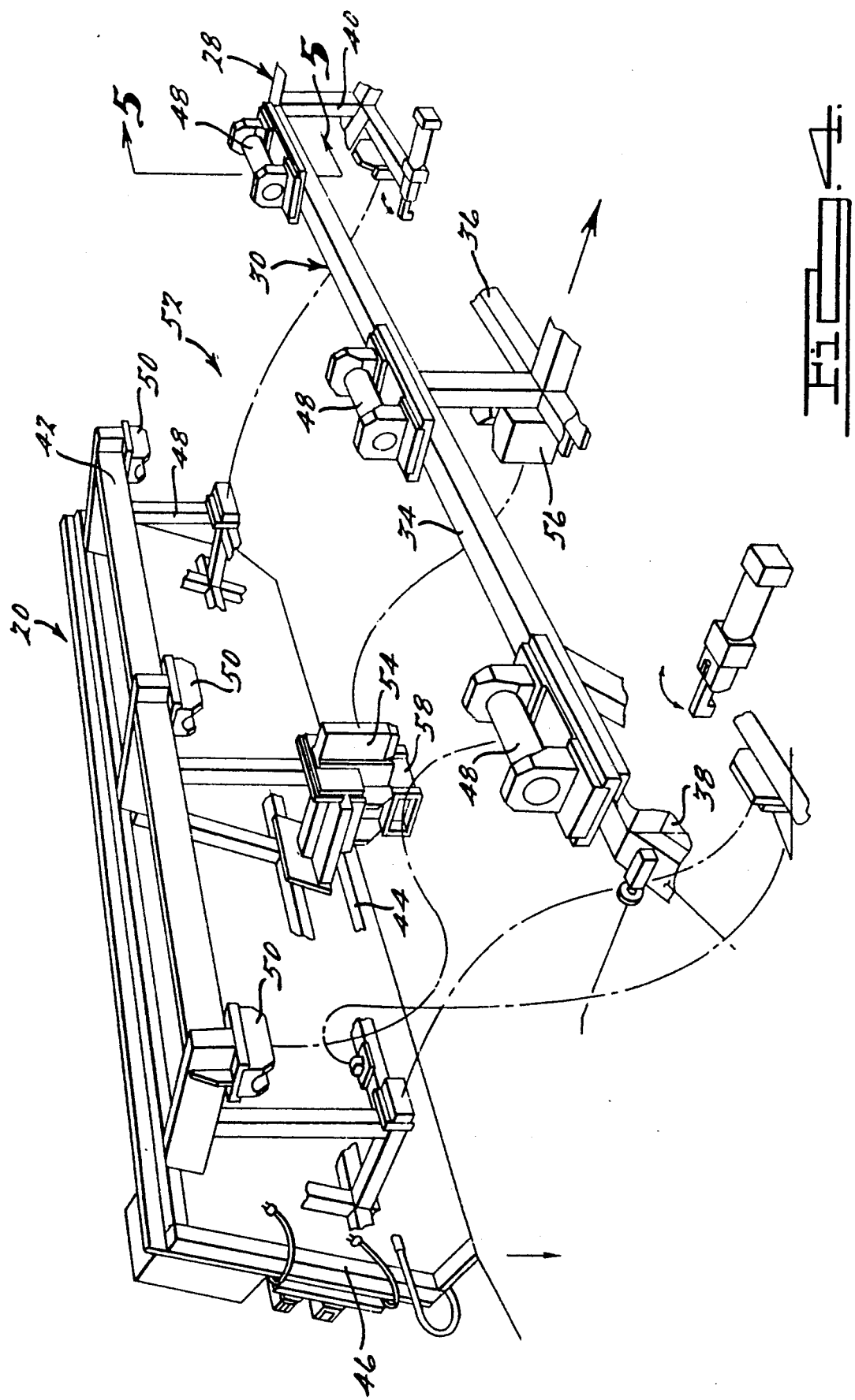
FIG. 4 is a perspective view showing a fixture being mounted on a rotary table of the working cell.
Figure 5:
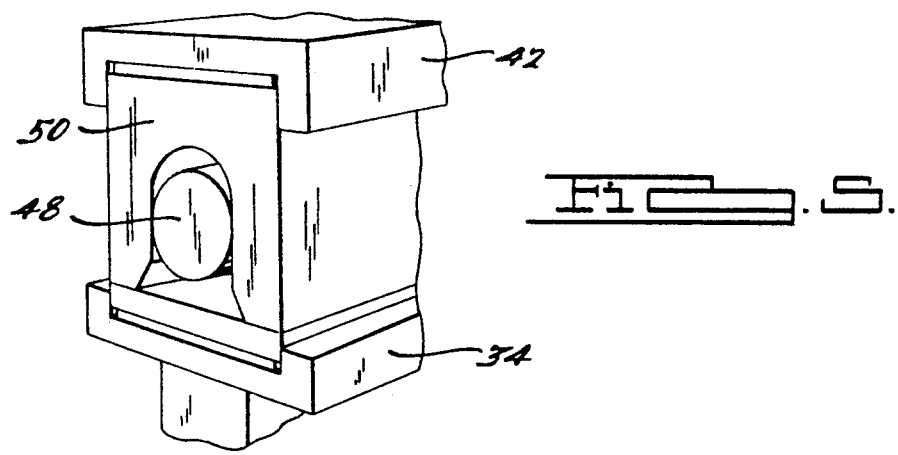
FIG. 5 is a perspective view taken along line 5—5 of FIG. 4.

A self-contained integral gear and bearing assembly drives the rotate unit. A cylindrical gear 82 is horizontally disposed relative to base 26 and connected to the rotary table. The gear has teeth extending radially inward from an inner circumference thereof and the outer circumference connected to the rotary table. A gear motor 84 having a toothed drive wheel is disposed interiorly of the gear wheel, the teeth of the gear wheel and drive wheel being meshed for driving rotation. Advantageously this provides a better weight distribution and stiffness, an accessible central area for maintenance of the A.C. drive, and a simple design. In FIG. 3, gear 82 and gear motor 84 are shown being removed from the center of rotate unit 18. Once installed the basic cell is designed to stay regardless of the model change or product type.

Apparatus for substantially simultaneously controlling the operation of the conveyor 12, the rotate table 28, the clamping blocks 62 and 64 and the drive motor 82 is provided to interrelate specific vehicle frames 14 being transported with mounting fixture 20 and work tools at a specific workstation 18. An electrical control switch (not shown) on table 28 signals when a side of the table is at a predetermined angular position and a programmable computer 86 associated with the switch controls drive motor 84 and thus the position of rotary table 28 relative to the predetermined stopping position defined by the locator to position table 28 and selected of the workpieces relative to the preselected stopping position. The actuation of the clamping block 62 and 64 is such that rotate table 28 is angularly ahead of the targeted stopping position, thereby ensuring the accurate placement of the workpiece in a desired stopping position.

The control also includes a controller 88 for controlling operation of a machine tool capable of performing desired work on the workpiece when in the desired position.

Also provided are actuator means, including a comparator, for actuating the clamping blocks 62 and 64 to effect brake action in response to the computer 86 indicating the table to be in a particular location.

FIGS. 9-14 show calibration of the unit. The rotate unit sequence is as follows: (a) accelerate, (b) decelerate, (c) creep into shock and stop, (d) stop, and (e) actuate lock.

Turning now to FIGS. 15A-15L, assembly of a multi-piece side frame is detailed for an assembly line comprised of seven work stations. Both manual and automatic input is used to perform tasks at the various work stations. Adjacent work station #1 (FIG. 15A), an operator at 1B manually loads parts on a carrier whereby to be free to assist at work station #2. At work station #1 (FIG. 15B) operators manually load loose parts (or tack weld parts) in the first fixture. Advantageously, this establishes product dimensional integrity before the side frame is advanced along the assembly line.

The side frame is advanced to work station #2 (FIG. 15C) whereat programmed robots pierce holes for attachment bolts. If needed, weld robots could be provided. The side frame is then advanced to work station #3 (FIG. 15D) whereat an operator secures bolts to the frame and to an idle station 3A (FIG. 15E) whereat an operator loads parts and positions loose parts on the carrier on the side frame.

The side frame is advanced to work station #4 (FIG. 15F) and then to work station #5 (FIG. 15G) whereat two programmed robots weld center pillars to the side frame. In work station #6 (FIG. 15H) an operator performs manual welds as needed, such as on front and rear roof header reinforcements. Thereafter, the side frame is advanced to work station #7 (FIG. 15J) whereat robots perform welds on the side frame.

Thereafter the side frame is advanced to work station #7A (FIG. 15J) whereat an automatic pick and place device or robot unloads the side frame from the carrier, and the carrier would be returned to pick up another side frame.

Figure 15K:
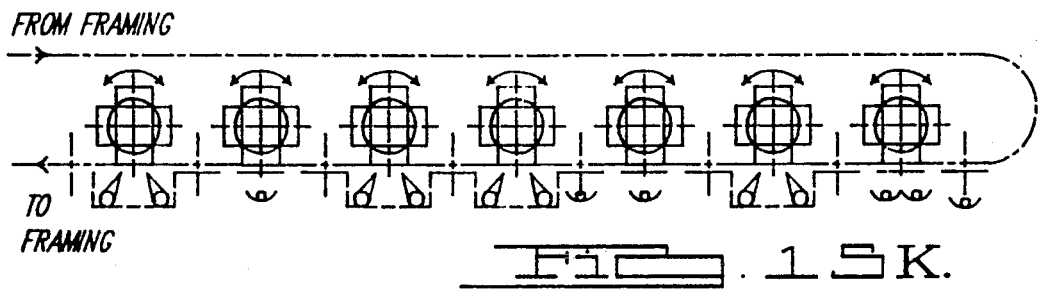

Depending on the application, FIG. 15K shows an assembly line wherein a completed side frame remains on the exchange product carrier for direct delivery to a framing station.

Figure 15L:
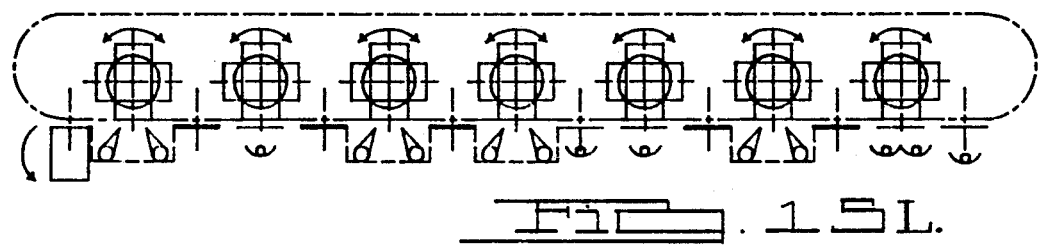
Figure 18:
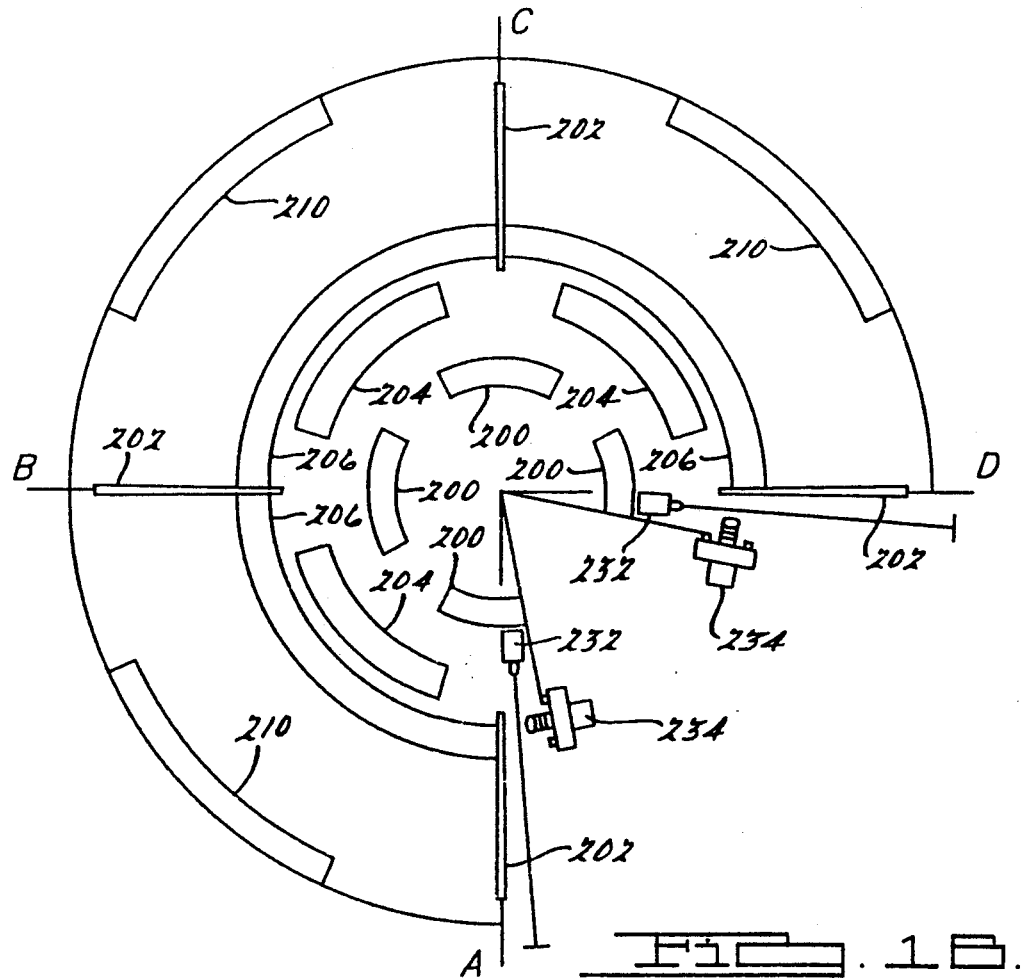

FIG. 15L shows idle stations 1A, 2A, 4A, 5A, 6A can be used for manual backup welding, loading, or inspecting.

The rotate storage unit described above requires a large number of rotational positions to be monitored. FIG. 16 is a diagrammatic illustration of the rotation of the unit. Each segment illustrated in FIG. 16 represents a "window" that must be opened and closed during rotation. Each of the "windows" illustrated requires two set points, open and closed. To monitor all these points with individual switches and actuators would be very costly and difficult to maintain. Existing electronic rotation monitoring devices with multiple set points require the individual calibration of a large number of set points.

Instead, as illustrated in FIG. 16, a multiple resolver rotation transducer is used to provide a distinct numeric value to a programmable controller for increments of rotation of the unit, which is approximately 17 seconds, depending upon system resolution. Since a resolver is an absolute feedback device, it can lose power, or be moved without power applied, and still report accurate position when power is re-applied.

Instead of manually calibrating two individual set points for each position, only the width of the various "windows" in resolver counts must be empirically determined. The necessary set points are calculated once one of the four stop positions labeled A, B, C and D on FIG. 16 has been determined. These calculations may be routinely performed by a computer programmed as known in the art. In the configuration illustrated in FIG. 16, four positions are to be used and are calculated to be equally spaced, i.e. 90°. Thus, all required set points can be automatically established after only one table position is programmed, greatly reducing set up time and the chance for machine damaging errors.

If parameters such as deceleration distance are affected by load-causing inertia changes, or tighter positioning requirements are needed, only a "window" value must be modified and all set points may be similarly adjusted, which can be automatically done through the computer program. This facilitates continuing optimum rotation performance with minimum adjustment time.

If it is desired to locate a fixture at a position other than at a 90 degree increment, the exact position location is measured and the calculations based thereupon. As noted below the individual fixture location may be fine tuned.

If a resolver becomes damaged and must be replaced, an approximate zero point can be quickly determined for the new resolver and all set points immediately recalculated. This greatly reduces unplanned maintenance time.

The "windows" are defined by the operation of the rotary unit. It is desired to improve efficiency by reducing the time for rotation and positioning. However, due to the nature of the work, accuracy of positioning is essential.

Figure 6:
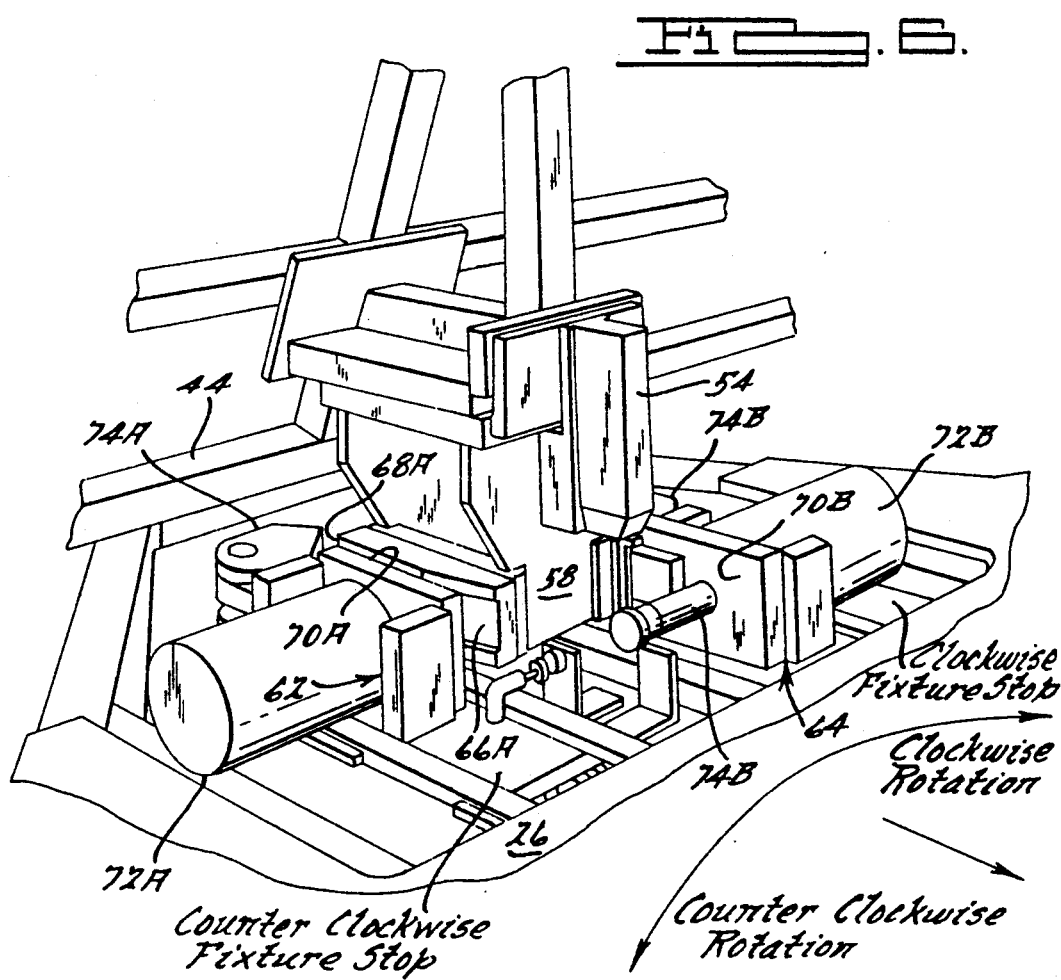
FIG. 6 is a perspective view of a clamp and locating means for engaging the fixture and positioning the table.

Positioning at a station is accurately conducted by use of the clamping blocks 62 and 64 (illustrated in FIG. 6). Depending on the direction of rotation, one of the two blocks is extended to engage the locator block 58 on the fixture. Until the specific locator block is within "range" of the desired station, all clamping blocks must remain retracted to permit free rotation of the unit. This is the locator "clear" window shown at 204. Once the locator block for the fixture next to the fixture to be positioned has cleared the second clamping block at the desired station, that clamping block may be activated (extended) to engage the locator block of the desired fixture and once engaged, the other of the two blocks is extended to wedge the fixture in place. The "range of unit" position for this second clamping block to engage is shown as window 202. These windows are pre-programmed to avoid damage of the unit during set-up.

While it is preferred to minimize the time of rotation, it is undesirable to allow the unit to rotate full speed into a clamping block. Thus, it is desirable to accurately determine the point at which deceleration must begin. Since the unit achieves a constant angular acceleration rapidly, the distance for deceleration from the rotate speed will be the same regardless of whether the unit is rotated 90° or 270°. Deceleration is simply achieved through the switching of the motor to a lower speed and allowing the motor to act as a brake. The distance for deceleration will depend on the motor and the mass of the unit, which will vary depending on the mass and number of tooling stations. The windows 210 are defined by the two end points which represent the points at which the motor is switched for deceleration for the proximate station, depending on the direction of rotation.

The motor is switched from rotate speed to "creep" speed as the unit approaches the desired position. The unit rotates at creep speed until it engages an extended clamping block. At this point, the second clamping block is activated (engaged).

Since the rotate speed is approximately 20 times as fast as the creep speed, it is essential to minimize the creep time. To rotate the unit even $\frac{3}{4}''$ at creep speed can take approximately one second of the desired seven second or less of rotation time. The braking characteristics of the motor being known, calibration of the deceleration point is begun for a single station somewhat cautiously through trial and error. Once the deceleration point is satisfactorily determined, the same angular deceleration distance is then used for each station from each direction, which can be automatically programmed utilizing the resolver.

Should conditions be altered, such as the addition of tooling to change the weight of the unit, the deceleration distance may be recalibrated once for one station and then be automatically changed for each station.

A pair of limit switches 232 are provided at each end of the units rotation to automatically turnoff the motor and prevent run-away rotation. Positive stops 234 are further provided to halt run away rotation. The windows 206 and 202 illustrate the full range of rotation of the unit.

Typical calibration process first involves the selection of a zero position. This is a random event for the processor, but once set, all calculations are made from that datum. To accomplish this the unit is rotated in a clockwise direction until the overtravel limit switch, 232, is actuated. The resolver is then reset so this position becomes electronic "O". The window 204 is immediately calculated to avoid equipment damage during subsequent operations. All other windows are approximated at this time. The fine tuning of an individual station is performed as follows: Assuming station A is used (any one can be), the unit is manually rotated so that a fixture can be clamped into A. The motor is then activated in one direction at low speed until all mechanical play in the system is taken up. A resolver reading is taken. The motor is then reversed at low speed until the mechanical play is taken up in the other direction and another reading is taken. The average of the two readings is the station center reference point. Since a similar procedure may be used at each station, the stations need not be precisely installed on the unit. The resolver is thus programmed to recognize where the station actually is rather than where it was supposed to be.

While the above description constitutes the preferred embodiment of the invention, it will be appreciated that the invention is susceptible to modification, variation, and change without departing from the proper scope or fair meaning of the accompanying claims.

What is claimed is:

1. A method of calibrating a rotary tool unit for an assembly line or the like, said rotary unit having a motor having at least a normal rotation speed and a creep speed, a plurality of tool stations, and externally positioned clamping blocks for precisely positioning one of said tool stations at a work station, said method comprising:

measuring a necessary angular deceleration distance for said unit;

determining a desired angular creep distance, including margins of safety;

identifying angular positions for tooling on said unit, determining the range of said clamping blocks;

empirically determining angular switch points for decelerating and engaging the creep speed of said motor to minimize the time to rotate said unit to precisely position any one of said tooling stations at said work station, and inputting said switch points into programmable controller through a multiple resolver rotation transducer.

* * * * *

UNITED STATES PATENT AND TRADEMARK OFFICE
CERTIFICATE OF CORRECTION

PATENT NO.  : 5,150,624
DATED       : September 29, 1992
INVENTOR(S) : Kaczmarek et al.

It is certified that error appears in the above-identified patent and that said Letters Patent is hereby corrected as shown below:

Column 3, line 10, "revolver" should be --resolver--.

Column 4, line 4, insert --the-- between "in" and "work".

Column 10, line 15, insert --a-- after "into".

Signed and Sealed this

Twenty-eighth Day of September, 1993

Attest:

BRUCE LEHMAN

*Attesting Officer*         *Commissioner of Patents and Trademarks*